Sept. 29, 1964 V. D. ELARDE 3,151,278

ELECTRONIC CIRCUIT MODULE WITH WELDABLE TERMINALS

Filed Aug. 22, 1960 3 Sheets-Sheet 1

INVENTOR.
Vito D. Elarde
BY
L. F. Hammand,
Atty.

ELECTRONIC CIRCUIT MODULE WITH WELDABLE TERMINALS

INVENTOR.
Vito D. Elarde
BY
L. F. Hammond, Att'y.

ELECTRONIC CIRCUIT MODULE WITH WELDABLE TERMINALS

Filed Aug. 22, 1960 3 Sheets-Sheet 3

INVENTOR.
Vito D. Elarde
BY
L. F. Hammand.
Atty.

3,151,278

ELECTRONIC CIRCUIT MODULE WITH WELDABLE TERMINALS

Vito D. Elarde, Downers Grove, Ill., assignor to Amphenol-Borg Electronics Corporation, Broadview, Ill., a corporation of Delaware Filed Aug. 22, 1960, Ser. No. 50,979
4 Claims. (Cl. 317—101)

The present invention relates to electronic circuits and particularly to so-called "packaged" circuits or "circuit modules."

It is the primary aim of the invention to provide circuitry of unique design capable of achieving extreme dependability of operation coupled with complete electrical accessibility, simplicity of mechanical and electrical design, and yet capable of unusually compact grouping of components. Other important objects of the invention are to provide circuit means capable of achieving compactness of the interconnecting circuitry as well as in the positioning of the individual components, and wherein the arrangement is not limited to use with special types of components such as the so-called "solid state" networks or micro-module "wafers," but is equally applicable to conventional types of resistors, capacitors, transistors and other components.

A further important object is the provision of circuit elements of the general type indicated above, together with the provision of a unique form of circuit board coacting to accomplish increased reliability, faster assembly and lower weight than heretofore commonly achieved, yet wherein it is entirely practicable to weld the junctions between the individual circuit elements, if desired, particularly for operation in temperature ranges where soldered joints are impracticable.

A still further object of the invention is the provision of electronic circuit elements of design and construction such that any circuit "package" may be encapsulated in a single solid module of epoxy resin or other potting compound, with the resin being of uniform chemical composition and homogeneous throughout; whereby difficulties arising from mismatching of thermal coefficients of expansion of the encapsulating materials are eliminated.

Other important objects of the invention are the provision of improved circuit board elements capable of extremely close spacing of conductors and thus suited to fine line circuitry, yet so designed as to drastically reduce the possibility of wiring errors in the course of assembly and to eliminate the practice of "clipping out" portions of bus bars or other connections after assembly.

In short, it is the basic object of the present invention to provide circuit elements which succeed in reconciling heretofore conflicting factors to simultaneously achieve the following structural and functional advantages:

(1) Extreme dependability, affording (*a*) improved physical strength, (*b*) great resistance to impact and vibration, (*c*) satisfactory performance at temperatures far above the practical range of soldered joints; and yet with (*d*) environmental protection of all components by complete encapsulation.

(2) Complete electrical accessibility of the circuitry, permitting testing of the entire circuit or repair of any of the connections thereof, even after encapsulation or "potting" of all of the components into a solid unitary shockproof assembly.

(3) Simplicity of assembly of components by methods largely precluding the possibility of wiring errors, yet in a manner whereby the completed units are relatively compact, light in weight, and not unduly expensive, and (4) With unusual circuit density, even with the use of standard, full-size electronic components of easily available types.

The above objects are accomplished in the present invention by the combination of a new concept of component packaging which employs a unique method of assembly of the individual components with respect to the circuit conductors by which they are interconnected, coupled with the provision of a novel circuit board utilizing plated circuits, but arranged to include projecting metallic terminal tabs whereby all of the electrical junctions may be on the exterior surface of the packaged circuit, where they are accessible for soldering or welding and, of course, for tests, or repair. Hand wiring is eliminated, and solder dipping may be practiced by dipping only the joints, not the boards. Component leads may be welded, affording electrical junctions capable of withstanding higher temperatures than heretofore practical, even while subjected to violent vibration or impact.

The manner in which the foregoing objects are accomplished in the present invention is hereinafter described in connection with the drawings attached to and forming a part of the present specification and illustrating, in the first instance, methods of manufacturing the unique laminated circuit boards utilized in the preferred practice of the present teachings and, secondly, showing the manner in which the circuit board elements are assembled with standard types of electronic circuit components to achieve the beneficial objects enumerated above.

In the drawings:

FIGURES 1 to 8, inclusive, are greatly enlarged diagrammatic cross-sectional views of an electronic circuit board element according to the present invention, showing the successive steps by which it is manufactured.

Figure 19:
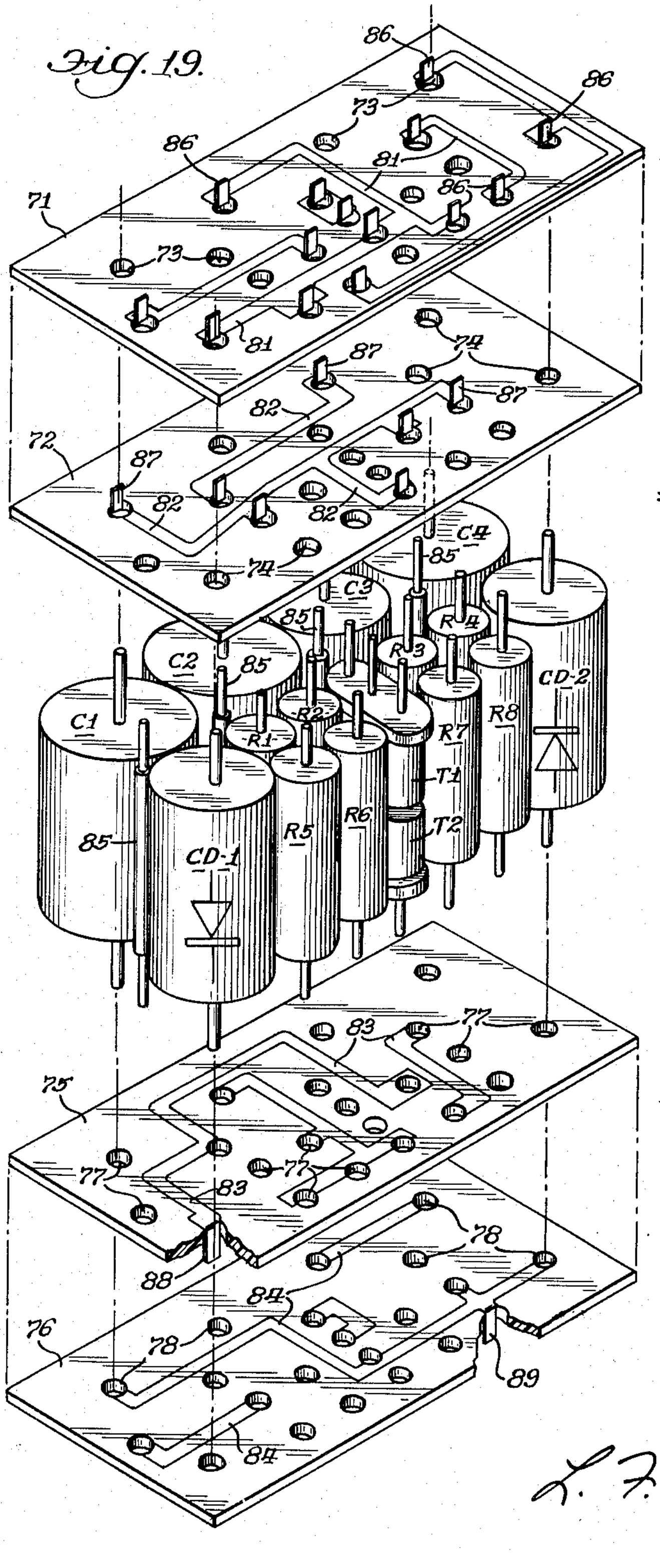

FIGURE 19 is a greatly enlarged "exploded" perspective view of a packaged electronic circuit constructed in accordance with the teachings of the present invention, the view showing the manner in which circuit boards made in accordance with the figures heretofore described may be utilized even with standard, full-size electronic components, to result in the formation of an unusually compact, rugged, high density circuit package wherein the circuitry between the components is pre-established by the layout of the internal conductors of the circuit boards.

Figure 20:
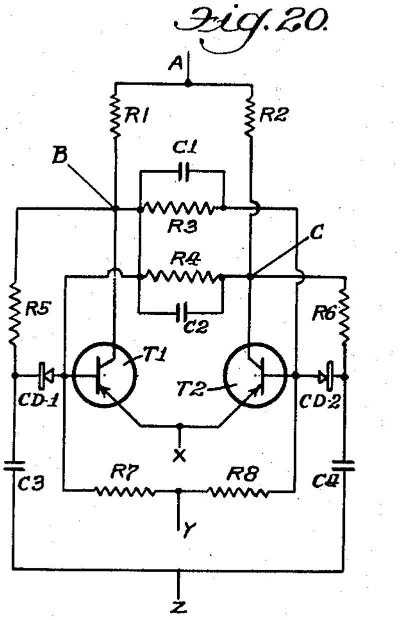

FIGURE 20 is a schematic wiring diagram of a typical semi-conductor network, chosen at random as a representative example of a data-processing circuit such as commonly utilized in connection with packaged circuits and circuit modules.

Figure 21:
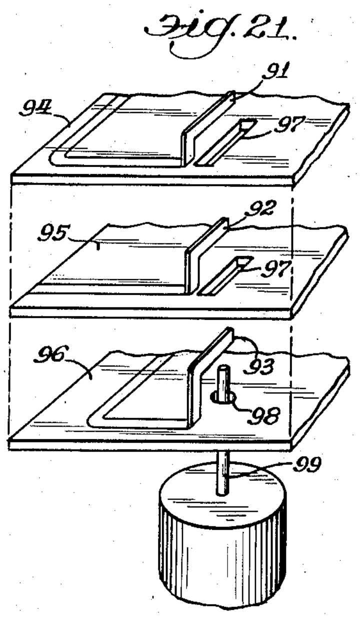

FIGURE 21 is an enlarged fragmental exploded prespective view of a somewhat modified form of circuit board assembly, utilizing triple layers of circuit board superposed upon each other.

The present invention provides for the production of packaged or pre-assembled electronic circuits wherein the several components are interconnected by one or more circuit boards, but both the assembled circuits and the boards utilized in their manufacture differ from conventional printed, etched or inlaid circuitry in several respects, from which important advantages flow.

One important feature is that, according to the present invention, the boards are each provided with an upstanding metallic tab or terminal strip, projecting outwardly from the plane of the board at every junction of the circuit. These terminals accomplish a double function in that they (1) render the boards adaptable to interconnection with the circuit components by spot welding (rather than by soldering techniques, for example), and in that they (2) provide a circuit wherein all junctions are accessible for testing or repair, even after the entire circuit package has been assembled and "potted," with all internal wiring and all components entirely sealed in a single integral block of dielectric insulation, for example. According to the present invention, the boards may be made by two or three variations of the basic process involved, as illustrated, for example, in the succession of steps shown in FIGURES 1 to 6, inclusive, FIGURES 9 to 11, FIGURES 13 to 15, or FIGURE 16.

Figure 1:
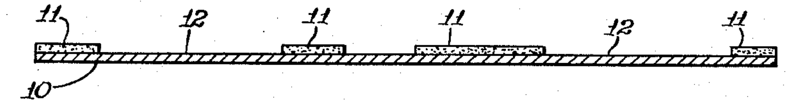

FIGURE 1 shows a cross-sectional view of a base or backing sheet 10, which may be of any thin, relatively inexpensive conductive metal, but preferably of copper, upon which a coating of resist material 11 is applied according to a predetermined circuit pattern. Use of a conventional photo-resist coating is to be preferred for fine line work, but any screening or other technique designed to leave blank areas 12 on the face (upper surface) of the sheet is practical, it being understood that these blank areas correspond to the desired pattern of the circuit conductors, as is conventional. The second step of the process is to plate the exposed surfaces 12 with a layer of conductive metal and thus build up circuit conductors 13 on the blank areas 12. Obviously, the plating may be any thickness desired and may be in accordance with any desired shape or conformation. In general, the pattern of conductors is dictated by the particular requirements of the circuit under construction. Also, it will be obvious that the plating may be accomplished with any type of metal desired, but it has been found highly satisfactory to use a metal such as nickel, for example, in order to facilitate the welding operations hereinafter described and to thus achieve the greatest possible dependability of circuit operation. Nickel tabs flashed with gold are suited to welding or soldering, or both.

Figure 3:
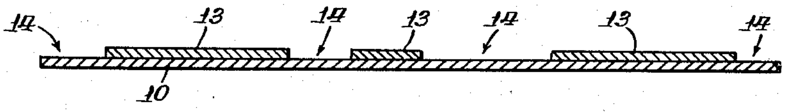
Figure 4:
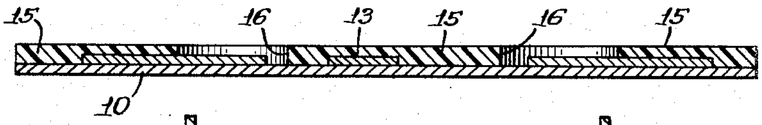
Figure 5:
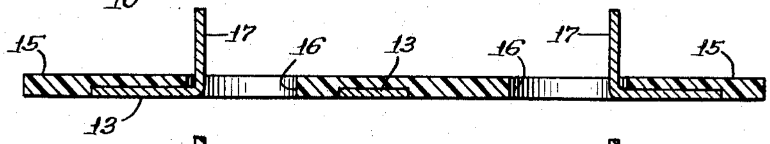

In the third step of the process, the resist coatings are removed from the face of the sheet 10 as indicated at 14, leaving the plated circuit lines 13 (FIGURE 3). The face of the backing sheet is next covered (FIGURE 4) by a dielectric layer 15, formed of epoxy resin, for example, or of ceramics, Teflon, or organic laminate, and covering the sheet except for holes 16 where "tabs" are to be formed. The backing sheet 10 is then removed, leaving the metallic circuit conductors 13 embedded in the dielectric layer 15, but with unsupported terminal portions of the circuit conductors extending into the holes 16, from which they may be bent upwardly to form upstanding tabs 17 as illustrated in FIGURE 5.

In the preferred practice of the present invention, the copper backing sheet is removed by an etching process whereby the copper is entirely dissolved by the action of appropriate chemicals, but other conventional processes may be utilized. These processes include stripping the sheet 10 from the epoxy 15 or melting it therefrom, particularly if a foil or other low temperature metal backing is employed.

The final step in the manufacture of the circuit board described above is illustrated in FIGURE 6, from which it will be seen that a back layer 18 of epoxy resin or other insulating material is applied to the underside of the board, leaving the circuit conductors 13 thereof completely enclosed, insulated from both sides, and accessible only through the several tabs 17 projecting from the holes 16.

Figures 6, 7, 8:
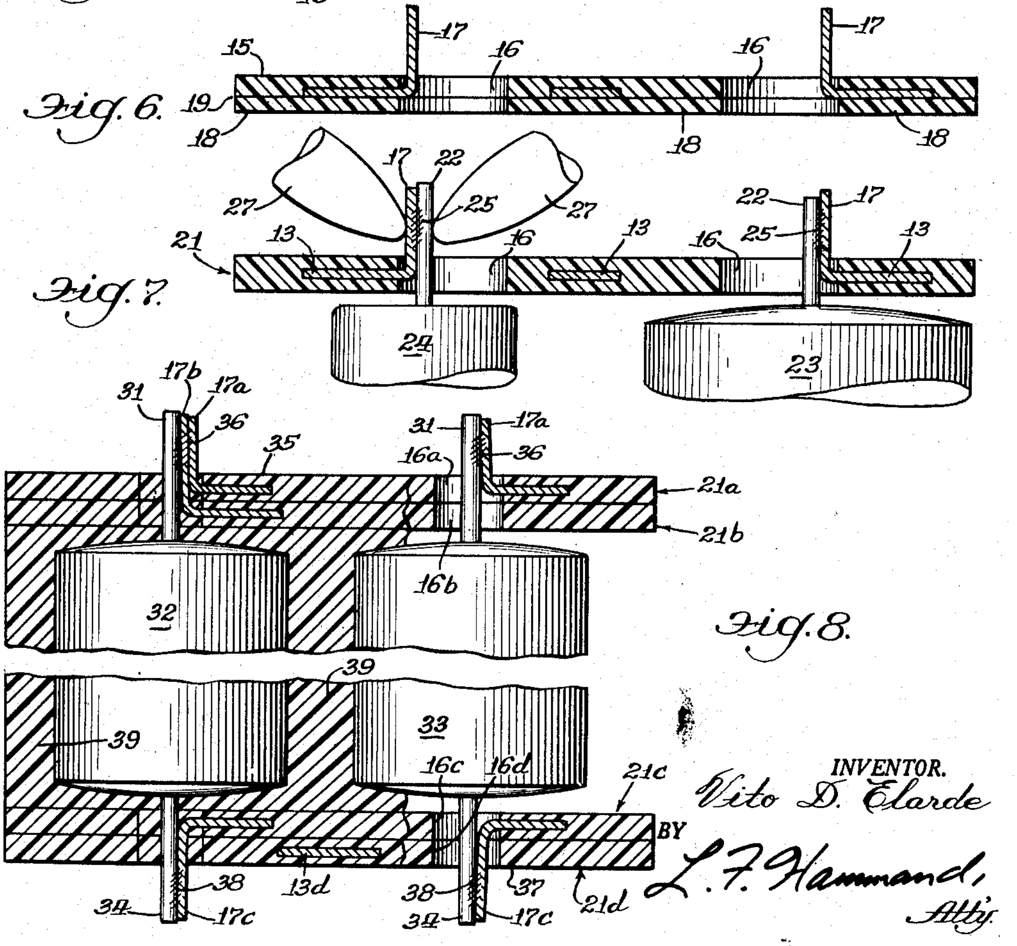
Figure 9:
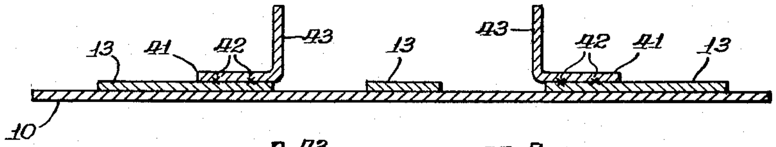
FIGURES 9, 10, 11 and 12 are similar cross-sectional views showing four successive steps in the manufacture of circuit boards according to a slight modification of the invention.
Figure 10:
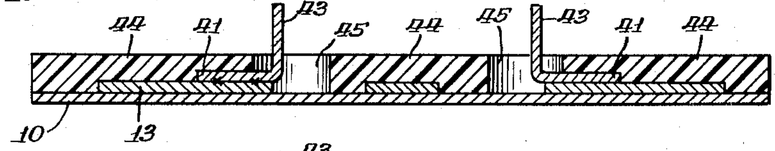
Figure 11:
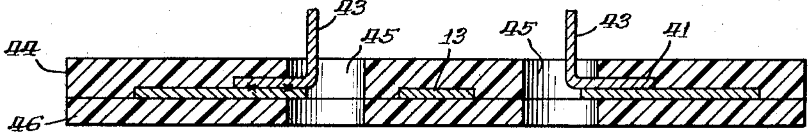
Figure 12:
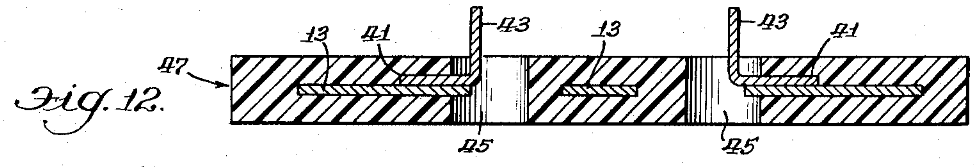

It is to be noted that, although a distinguishing line between the layers is indicated at 19 in FIGURE 6, yet the epoxy resin of insulating layer 18 may be identically the same compound as the layer 15 previously applied, and if these layers are of the same composition there will actually be no line of demarkation. Instead, the two layers of dielectric will blend into a single, unitary lamination 21, surrounding the internal conductors 13, as best illustrated in FIGURE 7.

A typical way in which the circuit board of the present invention may be interconnected to electronic components used in connection therewith is illustrated in FIGURE 7, from which it will be seen that the leads 22, typical of conventional components such as the capacitor 23 and resistor 24 illustrated, may be inserted through the openings 16 in the board and attached to the upstanding tabs 17 by welding as at 25. It is to be particularly observed that the tabs 17 and the several leads extending from the electrical components are easily accessible to permit accomplishment of the welds in the conventional manner, as by application of a pair of welding electrodes 27.

Obviously, more than one circuit board may be used at each end of a group of components. When plural laminations of circuit board are used, as in FIGURE 8, the circuit boards **21*a* and 21*b* are designed to have apertures 16*a* and 16*b* in alignment with each of the upper leads 31 from the components 32, 33, and holes 16*c* and 16*d* aligned to receive each of the lower leads 34. The boards are thus positioned so that the tabs 17*b* from the inside circuit board, as well as the tabs 17*a* from the outside board, may project outwardly beyond the exterior face 35 of the outside board 21*a*, where the tabs from both boards may easily be welded to the projecting leads by a single welding operation at each of the junctions 36. Similarly, the tabs 17*c* from the board 21*c* project outwardly (downwardly) through the apertures 16*d*, and extend below the exterior surface 37 of the lowermost board 21*d* where they are accessible for welding to the leads 34 at each of the junctions 38, even in those instances in which there may be no connection with the internal conductors 13*d* of the lowermost circuit board 21*d***.

It follows that, by the teachings of the present invention, the entire circuit may be assembled and all of the connections between the various leads and circuit board tabs may be welded or soldered at junction points completely outside of the circuit package, where they are exposed and accessible. Thus, each junction may be reached individually for inspection, circuit testing, or repair, even though the entire circuit package and all components included therein be encapsulated by insulating compound 39.

Obviously, any desired exterior connections to the circuit may be established merely by extending the appropriate component leads 31 and 34 to exterior wiring or to another circuit board. The exposed junctions of the circuit may be thereafter covered with epoxy or otherwise insulated, if deemed desirable. An alternative means for establishing exterior connections to the circuit package is to provide exposed contacts along an extended edge of one or more of the circuit boards for engagement with a conventional connector receptacle.

The potting compound 39 and the epoxy laminations of the circuit boards may be hard and rigid if desired, although it is also within the concepts of the invention to utilize circuit boards which are rigid in some areas and flexible in others. Potting material having a considerable degree of yieldability and resiliency may also be used to act as a cushion mounting for the individual components and to avoid stresses on the conductors extending therebetween.

Figure 2:
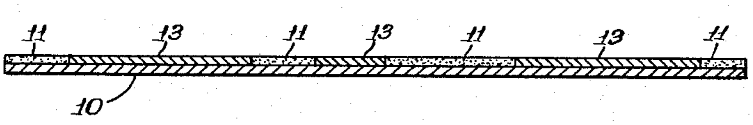

A somewhat modified embodiment of the circuit board of the present invention is illustrated in FIGURES 9 to 12, inclusive. This form of circuit lamination differs from the construction previously described in that the upstanding tabs are developed by the attachment of separate metal brackets, welded to the plated conductors of the circuit and at right angles thereto, rather than by utilizing a portion of the plated conductor itself as the tab. In constructing this variation of the circuit boards, the base plate or backing sheet is first covered with a chemical resist pattern, plated, and the resist thereafter removed as illustrated in FIGURES 1 to 3, inclusive. When so prepared (FIGURE 9), upstanding right-angled metallic brackets 41 are welded to the upper face of the plated conductor areas 13 of the circuit, as shown at 42, the brackets preferably including upstanding tab portions 43 as illustrated. The circuit board is then covered with an epoxy resin or other dielectric insulation 44 over its face surface, but with holes 45 left around the tabs 43 in a manner similar to that heretofore described. The circuit boards are then completed by dissolving the backing sheet 10, by etching fluid or otherwise, and by applying the second dielectric layer 46 to the back surface to form an integral laminated sheet 47 in the same manner heretofore described.

Figure 13:
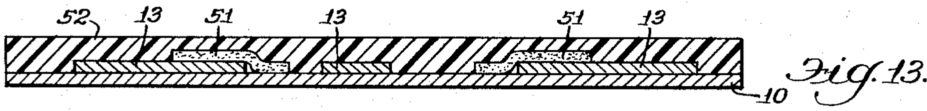
FIGURES 13, 14 and 15 are similar sectional views showing three successive steps in the manufacture of circuit boards according to a second modification of the invention.
Figure 14:
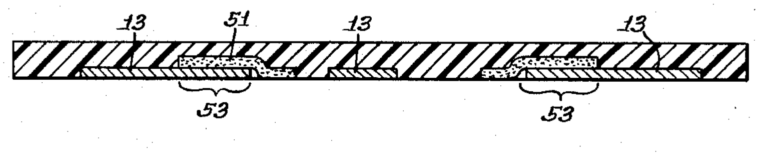
Figure 15:
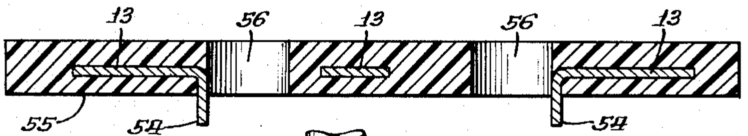

The form of the invention illustrated in FIGURES 13 to 15, inclusive, also utilizes the first three steps of forming the plated circuit illustrated in FIGURES 1 to 3, inclusive, but upon completion of the plated circuit of FIGURE 3, areas of the board at which terminals are to be provided are covered with spots of releasable material such as the thin tape 51 (FIGURE 13) prior to the application of the dielectric layer 52 to the face of the backing sheet 10. The backing sheet is then removed in the manner heretofore described, leaving those portions 53 of the conductors 13 that overlie the tape 51 relatively free of adhesion to the dielectric 52, so that they may be drawn away from the tape and bent laterally outwardly (downwardly) to form right-angled tabs 54 projecting from the plane of the circuit board. A further coating of dielectric material may be applied in a back layer 55 as shown in FIGURE 15 and, if desired, holes 56 may be formed in the vicinity of the tabs to facilitate electrical connection therewith.

Figure 16:
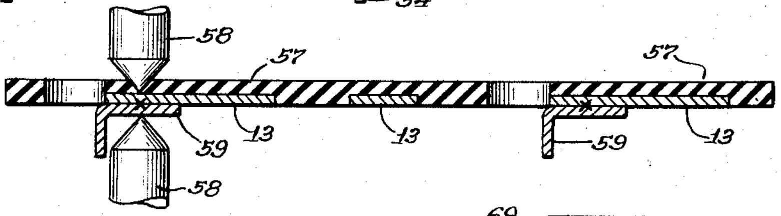
FIGURE 16 is another sectional view showing a further modification of the invention and illustrating optional means by which welded connections may be established on a circuit board.

In the modification of the invention illustrated in FIGURE 16, the plated conductor strips 13 are formed on a conductive metallic backing sheet in the same manner as described heretofore, except that the plated circuit is then covered by a dielectric coating 57 which may be of silicone rubber, "Kel-F" or other similar material applied over the plated pattern. The metallic portions 13 of the circuit may then be spot welded to other circuitry by application of a welding machine in a manner such that the electrodes 58 penetrate the dielectric coating 57 and are thus effective to establish a weld between the metal conductors 13 of the circuit and brackets or tabs 59.

Figure 17:
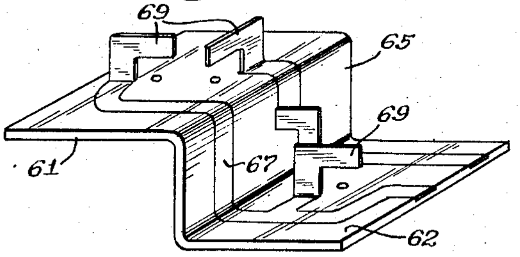
FIGURES 17 and 18 are perspective views of two typical three-dimensional forms of circuit boards as contemplated by the teachings of the present invention, it being understood that circuit boards of either of these figures may be produced by any one of the modified forms of the invention illustrated and described herein.
Figure 18:
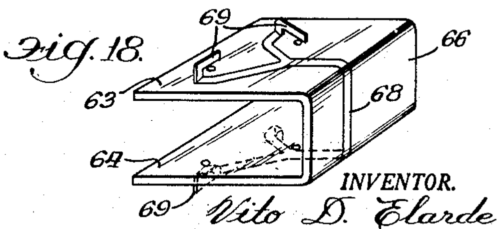

In FIGURES 17 and 18 there have been shown two illustrative forms of the present invention, each illustrating a circuit component including paired planar portions 61–62 and 63–64 with these portions interconnected by offset portions 65 and 66 extending therebetween, and carrying circuit conductors 67 and 68 extending between terminal tabs 69 on the separate levels of the planar portions. These are merely illustrative of the possibilities of the present invention, which is, of course, not limited to flat boards but extends to many and various three-dimensional shapes, any one of which may be constructed by any one of the several variations of methods hereinbefore described.

While the advantages flowing from the present disclosure are applicable to a wide variety of apparatus and almost endless varieties of circuits, the fundamental features inherent in its inventive concepts may possibly be best explained with reference to a specific semi-conductor network of one of the conventional types frequently encountered in compact circuitry such as electronic computers and data processing apparatus. A typical circuit chosen as reasonably representative of modules or "packages" often encountered in such apparatus is the binary counter circuit schematically shown in FIGURE 20 of the drawings. It is accordingly deemed appropriate to utilize such a typical circuit for purposes of explanation and for the fullest possible understanding of the advantageous features accomplished by the teachings of the present specification.

It will be noted, for example, that the circuit of FIGURE 20 includes some twenty electronic components in all, including two transistors T–1 and T–2, a pair of semi-conductor diodes CD–1 and CD–2, eight fixed resistors R–1 to R–8, inclusive, and four capacitors C–1 to C–4, inclusive, with the several parts of the circuitry connected in a manner such that there is no "common" lead or ground connection and wherein there are, therefore, an unusually large number of individual connections to be established between the several separate components involved. The manner in which this may be achieved in accordance with the circuit boards of the present disclosure is illustrated in FIGURE 19, wherein it will be observed that the invention permits arranging the various components in whatever grouping and orientation is best adapted to stack the several units as closely as is physically possible. This may be done without too great regard for the electrical connections which must be established between the several components, since by the teaching of the present invention even the most complex electronic circuits can be easily, quickly and positively established, merely by the utilization of one or more circuit board laminations arranged to receive the lead wires projecting from the individual components.

In the example illustrated, the capacitors C–1 to C–4 are aligned in a row with the diodes CD–1 and CD–2 set in convenient positions parallel thereto. The two transistors T–1 and T–2 are inverted with respect to each other and positioned in end-to-end relationship (to achieve the most compact physical stacking of the units possible), with the resistors R–1 to R–8 arranged in groups filling the spaces between the transistors and the diodes. A pair of circuit boards 71 and 72 disposed above the cluster of components have their holes 73 and 74 arranged to receive the several leads projecting upwardly from the grouped components. A pair of somewhat similar circuit board laminations 75 and 76 disposed below the components have their holes 77 and 79 spaced in the proper pattern to receive the leads projecting downwardly. The holes in each of the laminations 71, 72, 75 and 76 are pierced in proper spacing to correspond to positions of the leads to be received, and each of the boards has its internal conductors 81, 82, 83 and 84 arranged to interconnect the several components according to the circuit of FIGURE 20. Since these internal conductors are completely insulated and embedded between the surfaces of the boards, they may cross or bridge each other as may be required. Also, jumper wires 85 may be provided between the upper and lower pairs of circuit boards, as needed to establish any particular circuit.

The upper circuit boards 71 and 72 have their terminal tabs 86 and 87 projecting upwardly, while the lower boards 75 and 76 have similar tabs 88 and 89 oppositely oriented to project downwardly (as seen in the drawing). The intermediate circuit board laminations 72 and 75 have tabs 87 and 88 long enough to project upwardly through the holes in the board 71 and downwardly through the holes in the board 76 when the parts are brought to assembled position. Thus it will be understood that while the location and number of these tabs depends entirely upon the individual characteristics of the circuit, yet they will establish electrical connection, through the internal circuit conductors of the several circuit boards, between all of the individual leads of the several components of the circuitry, which also extend through the holes in each of the pairs of laminations. As heretofore described in connection with FIGURE 8, the tabs thus lie in side-by-side relation against one of the component leads when the parts are brought to assembled relation, whereby two or more tabs may be united with a given lead by a single welding operation.

Persons skilled in the art will recognize that while component groups or clusters such as illustrated in FIGURE 19 may include as few or as many individual components as desired, yet the present invention also lends itself admirably to sectional circuit construction whereby several or many individually independent packaged circuits constructed as described herein are interconnected as functional parts of a common system. In such cases particularly, several alternative methods are available for bringing out the necessary external connections of the circuitry (as represented by the lead wires A, B, C, X, Y and Z of FIGURE 20, for example). As heretofore indicated, the internal conductors 81–84 of the circuit boards may be employed to bring the desired connections to exposed contacts along an extending edge of one of the circuit boards, whereby it may be coupled to a conventional printed circuit connector. Alternatively, the individual leads involved may be projected through holes in a master circuit board and connected therewith by tabs as heretofore described.

It should also be noted that while the drawings attached hereto have shown the conductors embedded in the circuit boards merely in the form of simple ribbon-like members extending between the several tabs to which they are connected, yet the invention is equally applicable to the production of boards wherein these conductors include fine line patterns comprising inductances, radio frequency chokes, or resistors. Capacitors, shields, or other components may also be incorporated into the internal circuitry of the boards. In more complex circuitry three or more layers of circuit board may be provided. Also, as shown in FIGURE 21, tabs 91, 92 and 93 may be formed in offset shape and of progressively increasing lengths from the circuit boards 94, 95 and 96. Registering slots 97 and holes 98 are pierced in the boards to allow the offset ends of these tabs to overlie each other in mutual contact with the leads 99 from the components, in a manner to facilitate uniting each of the three tabs with the upstanding lead by a single spot-welding operation.

From the foregoing it will be apparent to those skilled in the electronic arts that the present disclosure provides features of advantage over prior circuit practices in several respects. Of primary importance is the fact that by employment of techniques disclosed herein, it is a much simpler and more practical operation than heretofore to produce complex yet compact electronic circuit packages wherein all of the electrical junctions are welded, rather than soldered. This results in circuitry wherein the electrical unions between the components are not only better electrically but are capable of withstanding much greater impact, vibration, or other physical abuses, particularly at elevated temperatures.

The applicant's approach to the utilization of welded circuitry departs rather sharply from prior known practices, however, in that it does not require hand wiring or "clipping" of bus wires after wiring, and thus avoids the ever-present possibility of wiring errors inherent in such processes. Instead, it utilizes circuit boards so designed that each board has one, and only one, separate perforation for each terminal lead from the component package. Obviously, this does much to preclude the possibility of wiring errors.

Of possible equal importance is the fact that, although the circuits disclosed herein are adapted for complete encapsulation, yet all of the circuit junctions may be kept exposed and accessible, even after the components and the circuit boards have been completely encapsulated. It follows that the completed circuit packages may be subjected to any and all conceivable tests, either of individual components or of the entire circuit, after all manufacturing operations are finished.

The present concept also makes for extreme compactness of circuitry in relation to the actual sizes of the electronic components involved, and thus lends itself to applications requiring high component density coupled with rugged structure and reliable performance. Circuits according to the present disclosure are ideally suited to use with any of the newer types of sub-miniature components, circuit wafer stacks or solid state devices, and are thus capable of meeting the most exacting space limitations, yet they are equally suited to the construction of circuitry of sufficiently high component density to meet most practical requirements, even utilizing conventional types and sizes of components.

The circuitry is also suited to a wide range of possible applications by reason of the fact that the junctions may be connected either by welding or soldering, as desired, or by any combination of the two techniques. In cases in which soldering is deemed preferable, the junctions may project from the circuit boards enough that they may be soldered by resistance heating, if desired, or dipped in solder without flowing the molten metal over the surfaces of the circuit board. The exposed position of the junctions also facilitate welding, and adapts the circuitry to extremely high temperature applications.

Having thus described my invention, what I claim as new and desire to secure by United States Letters Patent is:

1. In an electronic circuit, in combination, a cluster of electron components closely grouped with respect to each other and having a plurality of metallic terminal leads extending therefrom; together with a plurality of electronic circuit boards overlying each other, with matching apertures in each of said circuit boards in registry with the terminal leads of the individual electronic components and with each of the leads extending from a component through the apertures in at least two of said boards; the boards each having metallic circuit pattern conductors, with terminal portions of each of said circuit pattern conductors extending to a plurality of the aforesaid apertures and having weldable tabs free of insulating material projecting outwardly from the surface of the board in a direction away from the aforesaid cluster of electronic components; with the ends of the circuit conductor tabs of one circuit board extending through the aforesaid apertures in another circuit board and projecting therefrom, and with each of the tabs welded to one of the terminal leads by welds located on the opposite side of the circuit boards from the cluster of components.

2. In an electronic circuit, in combination, a cluster of electronic components closely grouped with respect to each other and having a plurality of metallic terminal leads extending therefrom; together with a plurality of electronic circuit boards overlying each other in face-to-face contacting relation; with mating apertures in each of said circuit boards in registry with the terminal leads of the individual electronic components and with each of the leads extending from a component through the apertures in at least two of said boards; the boards each having metallic circuit pattern conductors with terminal portions of each of said circuit pattern conductors extending to a plurality of the aforesaid apertures of the board and having weldable tabs free of insulating material projecting outwardly from the surface of the board in a direction away from the aforesaid cluster of electronic components; with the ends of the circuit conductor tabs of more than one circuit board extending from at least some of the aforesaid apertures and overlying each other in face-to-face relation with each other and with a terminal lead from one of the components; with a plurality of said tabs welded to a terminal lead by a single weld spaced outwardly from the exterior surface of the outer circuit board.

3. The method of assembling an electronic circuit package consisting of the steps of grouping a plurality of electronic components together with the terminal leads therefrom projecting outwardly from each end of the group in generally side-by-side parallel relation with respect to each other; passing the ends of the terminal leads extending from one end of the group through registering apertures in a plurality of circuit boards overlying each other and disposed above the group of components and generally perpendicular to the terminal leads thereof; passing the ends of the terminal leads extending from the other end of the group of components through registering apertures in at least one circuit board disposed below the group of components and generally perpendicular to the terminal leads thereof; thereafter establishing all junctions of the circuit by fusing the terminal leads of the aforesaid components to terminals of the circuit boards at points adjacent but spaced away from the opposite, exterior surfaces of the circuit boards, and selectively encapsulating the package components by encasing all of said components in dielectric material filling the space between the opposed circuit boards and surrounding the aforesaid components, while leaving the junctions between the terminal leads of each component and the respective circuit board exposed and accessible on the exterior of of the circuit package.

4. The method of manufacturing laminated circuit boards comprising the steps of applying metallic circuit pattern conductors on a face surface of a backing sheet; applying a plurality of individual masks to said sheet over the terminal portions of said conductors to prevent insulating material from bonding to the circuit terminals; covering the face surfaces of the metallic circuit pattern conductors and backing sheet with a layer of insulating material bonded to the conductors except at the terminal areas thereof; removing the backing sheet to leave the metallic circuit pattern conductors supported wholly by the insulating layer; and bending the portions of said conductors covered by the aforesaid masks outwardly from the plane of the circuit board to provide weldable tabs thereon projecting from the plane of the circuit board.

References Cited in the file of this patent

UNITED STATES PATENTS

| | | |
|---|---|---|
| 2,417,420 | Knapp | Mar. 18, 1947 |
| 2,596,237 | Gross | May 13, 1952 |
| 2,757,319 | Kapp | July 31, 1956 |
| 2,857,558 | Fiske | Oct. 21, 1958 |
| 2,862,992 | Franz | Dec. 2, 1958 |
| 2,869,040 | Pifer | Jan. 13, 1959 |
| 2,917,678 | Tepper | Dec. 15, 1959 |
| 3,029,495 | Doctor | Apr. 17, 1962 |
| 3,098,951 | Ayer et al. | July 23, 1963 |

FOREIGN PATENTS

| | | |
|---|---|---|
| 646,314 | Great Britain | Nov. 22, 1950 |